O. A. MYGATT.
SKIRTING FOR REFLECTORS.
APPLICATION FILED MAY 28, 1907.
989,062.
Patented Nov. 2, 1909.
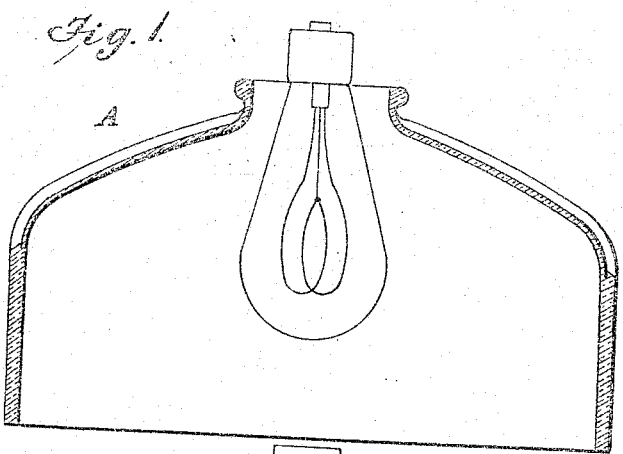
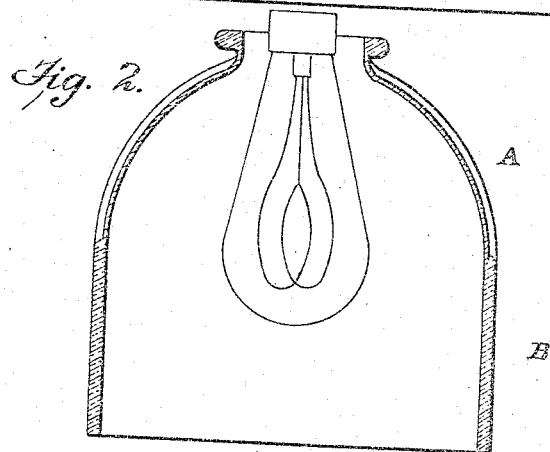
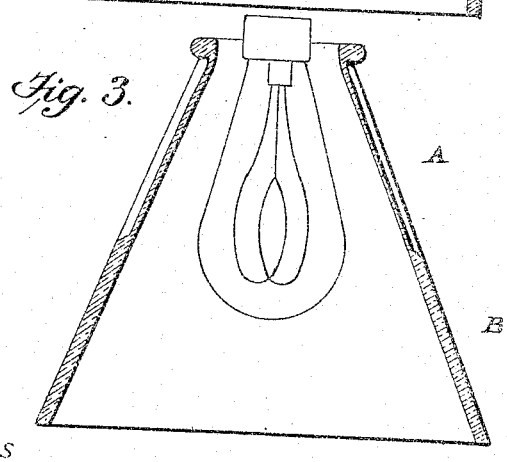

UNITED STATES PATENT OFFICE.

OTIS A. MYGATT, OF NEW YORK, N. Y.

SKIRTING FOR REFLECTORS.

939,062.      Specification of Letters Patent.      Patented Nov. 2, 1909.

Application filed May 28, 1907. Serial No. 376,155.

*To all whom it may concern:*

Be it known that I, OTIS A. MYGATT, a citizen of the United States, residing at New York city, in the State of New York, have invented new and useful Improvements in Skirtings for Reflectors, of which the following is a specification.

My present invention is for making reflectors of an integral piece of glass of which the upper part, or the body part beneath the collar portion, shall be composed of a specular reflecting medium reflecting most of the light out of the open mouth of the reflector, and the lower or flared mouth part composed of some interceptive light-diffusing or shading medium.

Reflectors at present in common use are so made that when in use with an artificial light inside, the side rays from the light, or the downward side rays, reach the eye direct, causing discomfort to the eyesight. In order to overcome this drawback, it has frequently been common to cover reflectors with hanging fringe either of silk or of bead glass to protect the eyesight from the direct rays of the light contained within the reflector.

The present invention is intended to embody in a one-piece glass article the reflecting qualities of a specular reflector, and the light shading or light softening qualities of the protecting fringe used for such a purpose.

Figure 1 illustrates one form of my reflector in which the portion A is composed of a specular light reflecting medium, and the portion B is composed of a light shading or light diffusing medium. The portion A reflects the upward rays of the light in downward directions out of the open mouth of the reflector. The portion B protects the eye from the direct rays of light, being composed of some light shading or light diffusing medium. Fig. 2 and Fig. 3 illustrate different forms embodying the same idea.

As a rule I prefer to make my reflectors of an integral piece of prism glass, the upper reflecting body portion A being covered with light reflecting prisms calculated to reflect the light back and out of the open mouth. The portion B may be made in different ways: for example (1) the interior or exterior, or both, covered with light diffusing prisms; (2) the skirt portion B may have light diffusing prisms on one side, with the other side either frosted or covered with any translucent but not transparent light diffusing medium, colored or otherwise; (3) the skirt portion B may be simply made of ground glass by sand blasting or covered with a translucent light diffusing medium, colored or otherwise; (4) the skirt portion B may be covered with a substance entirely opaque to light, thereby completely shading the eyesight from the direct rays of the light within the reflector. In all cases the parts A and B are integrally formed.

I claim:

1. An integral reflector or shade having an open mouth, and provided with reflecting means, and having a wide-mouthed skirt portion composed of a translucent light diffusing or shading medium.

2. An integral shade reflector of glass, the upper portion of which is provided with a specular reflecting medium, the lower portion being formed into a skirt with substantially vertical walls, the skirt being composed of a translucent medium.

3. An open-mouth reflector-shade having a portion reflective of light and, integrally therewith, a substantially vertical portion interceptive of some of the reflected light rays.

4. A glass open-mouth reflector-shade having prisms thereon reflective of light and a substantially vertical portion integral therewith interceptive of some of the light rays.

OTIS A. MYGATT.

Witnesses:
B. McC. GREENE,
J. PONSARD.